Sept. 25, 1956  W. C. CARMICHAEL  2,764,286
DISPLAY CARDS FOR SPECTACLE FRAMES OR THE LIKE
Filed Oct. 27, 1954

INVENTOR
WALTER C. CARMICHAEL
BY
Louis L. Gagnon
ATTORNEY

United States Patent Office 2,764,286
Patented Sept. 25, 1956

2,764,286

DISPLAY CARDS FOR SPECTACLE FRAMES OR THE LIKE

Walter C. Carmichael, Lexington, Mass., assignor to American Optical Company, Southbridge, Mass., a voluntary association of Massachusetts Application October 27, 1954, Serial No. 465,001

5 Claims. (Cl. 206—79)

This invention relates to improvements in display cards for spectacle frames or the like.

In display cards for spectacle frames or the like, it has been the general practice to secure the frame to the card by either threading the temples through holes formed in the card, with the temples folded over the rear surface or by providing securing means on the front surface adapted to overlie and clamp the folded temples.

The disadvantage of securing a frame to a display card in this manner is that the major portion of the frame will lie in unsupported relation to the front surface thereof and may be readily flattened or deformed by any pressure which might be brought to bear against it. This is a decided disadvantage because most frames are formed with a preset longitudinal curve or face form extending substantially from one temple to the other. This curve or face form is put into a frame so that it will generally conform to the curvature of the wearer's face and is important cosmetically. It will, therefore, be seen that it is of great importance that a frame be properly supported on a display card so as to retain its preformed shape, particularly when they are stacked one upon the other as in storage or when being shipped.

It is, therefore, the principal object of this invention to provide a display card which will overcome the disadvantages formed in prior cards and one on which a frame will be properly supported so as to retain its predetermined shape.

Another object is to provide a display card upon which a frame may be quickly and easily mounted for display and readily detached when desired.

Another object is to provide a display card of this nature that is simple and inexpensive to manufacture.

Other objects and advantages of the invention will become apparent from the following description taken in connection with the accompanying drawing, in which.

Figure 2:
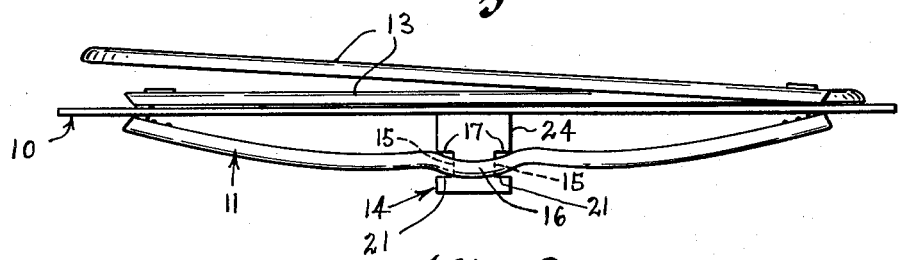
Fig. 2 is a top plan view thereof.

In the drawings wherein like characters of reference designate like parts throughout the several views, the display card embodying the invention consists of a normally flat piece 10 of cardboard or other suitable relatively stiff material and of any suitable width, length and thickness, upon which a spectacle frame 11 is adapted to be mounted. In the card 10 there is provided a pair of spaced openings 12, through which the temples 13 of a spectacle frame are adapted to extend. The temples 13 after being extended through the openings 12 are then folded over the back surface of the card, as shown in Fig. 2. The openings 12 are provided with substantially vertically disposed portions 22 of such size and shape that they will accommodate different sizes and shapes of temple tips and are further provided with inwardly extending narrow portions 23 communicating with the upper end of the verticaly disposed portions 22, adapted to receive the temple hinge portions when the temples are folded inwardly. The portions 23 are formed relatively narrow so as to properly support the frame on the card after the much wider temple tips have been extended through the vertical portions 22 and are folded over the back of the card.

Figure 3:
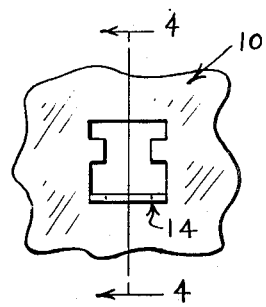
Fig. 3 is a fragmentary front elevational view of the card showing the frame supporting tab.
Figure 4:
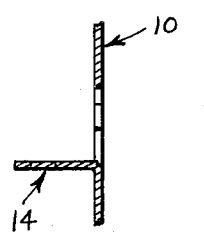
Fig. 4 is a sectional view of the frame supporting tab as taken on line 4—4 of Fig. 3 and looking in the direction of the arrows.

Formed midway between the openings 12 of the card 10 there is a frame supporting tab or brace 14. The tab or brace 14 is formed by striking the card with a suitably shaped die or by slitting or the like. The tab 14 is then bent outwardly from and substantially normal to the plane of the card, as best shown in Figs. 3 and 4. The tab 14 is, therefore, an integral part of the card and is cut along lines defining the desired shape of its outwardly extending portion. In this instance the outwardly extending portion is substantially rectangular and has a pair of opposed U-shaped notches 15 in the side edges thereof and adjacent its outer end. These notches 15 are adapted to receive the nasal edges of the rims of the spectacle frame 11, beneath the bridge, as shown best in Figs. 1 and 5, and are so located adjacent the outer end of the tab as to provide an intermediate portion 24 of a length sufficient to properly support the central portion of the frame above the card.

Figure 1:
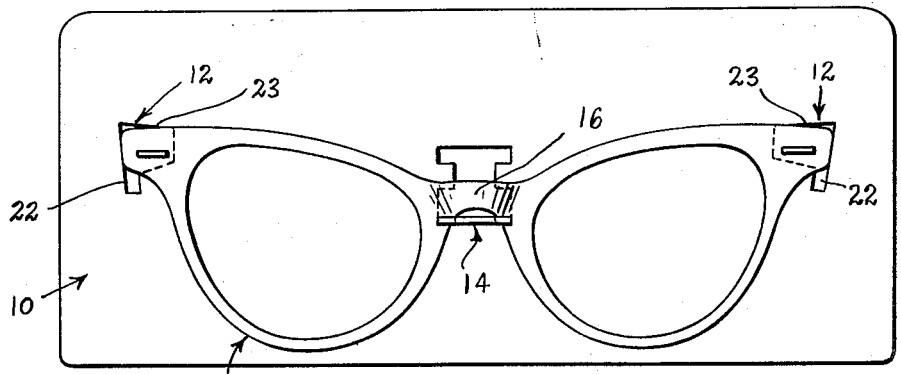
Fig. 1 is a front elevational view of a display card embodying the invention and showing a typical spectacle frame mounted thereon.
Figure 5:
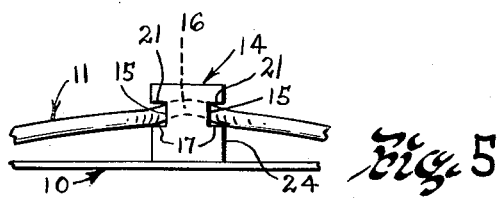
Fig. 5 is a fragmentary bottom plan view showing the frame supporting tab and frame in fitted relation with each other.

Referring particularly to Figs. 1, 2 and 5 of the drawing, it will be seen that when the frame 11 is positioned on the card 10 that the temples 13 will extend through the openings 12 and be folded over the rear surface thereof, the outer ends of the frame adjacent the temple hinges will bear against the front surface of the card and the nasal or bridge portion 16 of the frame will overlie the outwardly extending tab 14, with the portions of the rims beneath the bridge positioned within the U-shaped notches 15.

Figure 6:
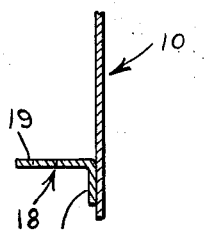
Fig. 6 is a fragmentary sectional view of a modified form of a frame supporting tab.

With an arrangement of this nature it may readily be seen that a frame mounted and supported as shown and described will be protected from being distorted by any pressure which would tend to flatten or cause it to lose its face form. This is due to the fact that the portions of the frame lying within the U-shaped notches 15 of the extending tab or brace 14 would bear against the walls 17 thereof and be held by the portion 24 from further inward movement. It will also be seen that the opposite walls 21 of the U-shaped openings will prevent the frame from being displaced outwardly. A modified form of the invention is shown in Fig. 6, wherein the outwardly extending tab or brace is formed of a separate L-shaped member 18, the outwardly extending portion 19 being of a similar configuration as the tab 14 and the portion 20 thereof extending at right angles being adapted to be secured to the front surface of the card 10, by any suitable means such as an adhesive, stapling or the like. The tab 18 could be of the same material as the card 10 or any other suitable material.

From the foregoing description it will be seen that simple, efficient and economical means have been provided for accomplishing al the objects and advantages of the invention. While the novel features of the invention have been described and pointed out in the annexed claims, it will be understood that changes may be made in the details of construction without departing from the spirit of the invention. I, therefore, do not wish to be limited to the exact details shown and described as the preferred form only are set forth by way of illustration.

Having described my invention, I claim:

1. A carrier card for spectacle frames or the like comprising a relatively flat card having spaced openings therein, one adjacent each of opposed side edges thereof, through which the temples of a spectacle frame may be extended to be folded over the opposed side of the card, and a relatively rigid supporting member extending outwardly substantially normal to the plane of the card intermediate said openings, said supporting member having shelf-like portions on the opposed sides thereof fitting beneath spaced portions of the frame adjacent the bridge and functioning as spacer means for supporting said bridge portion against displacement toward the card when the frame is attached to said card.

2. A carrier card for spectacle frames or the like comprising a long and narrow card having a pair of spaced openings therein, one adjacent each end, through which the temples of a spectacle frame may be extended to be folded over the opposed side of the card, and a relatively narrow tab on said card intermediate said openings having inwardly extending notches in the opposed sides thereof, said tab, when in use, being disposed in a plane substantially normal to the adjacent side surface of the card and having its notches straddling and interengaging with adjacent portions of the frame beneath the bridge and functioning as spacer means for holding the bridge against displacement toward the card.

3. A long and narrow carrier card for spectacle frames or the like formed of normally flat sheet material having openings spaced inwardly of the opposed sides thereof and being a distance apart from each other sufficient to permit the temples of a spectacle frame to be mounted thereon to be extended through said openings and to be folded over the opposed side of the card, and further having a supporting tab thereon intermediate said openings, said tab being relatively narrow and foldable from a position substantially in the plane of the card to a position substantially normal with said plane, said supporting tab having notches in the opposed sides thereof adapted to assume a position at a given distance from the plane of the card when said tab is substantially normal thereto, said notches being spaced a controlled distance apart to receive spaced portions of the frame beneath the bridge of said frame and said given distance thereof from the plane of the card being such as to support said bridge in desired spaced relation with the card when the frame is mounted on said card.

4. A carrier card for spectacle frames or the like formed of normally flat relatively stiff sheet material having openings spaced inwardly of the opposed sides thereof and being a distance apart from each other sufficient to permit the temples of a spectacle frame to be extended therethrough and folded over the opposed side of the card and further having an integral portion of a controlled length struck outwardly of the intermediate portion of said sheet material and being bent to a position substantially normal with respect to the plane of the card, said tab having U-shaped notches in the opposed sides thereof for receiving nasal portions of the frame adjacent the bridge and being at a distance from the plane of the card so controlled as to properly support the bridge portion of the mounting in spaced relation with the card when the frame is attached to said card.

5. A carrier card for spectacle frames or the like formed of normally flat relatively rigid sheet material having openings spaced inwardly of opposed sides thereof and being a distance apart from each other sufficient to permit the temples of a spectacle frame to be extended therethrough and folded over the opposed side of the card and further having a separate supporting tab with a portion secured to said card intermediate said openings, said supporting tab having a further portion substantially normally disposed with respect to the plane of the card and having notches in the opposed sides thereof shaped to receive portions of the frame beneath the bridge of said frame, said notches having edge portions disposed substantially in the plane of the card and spaced a distance from said plane so controlled as to properly support the bridge in desired spaced relation with the card and against displaceemnt toward said card.

References Cited in the file of this patent

UNITED STATES PATENTS

| | | |
|---|---|---|
| 1,687,138 | Myers | Oct. 9, 1928 |
| 1,952,071 | Hunter | Mar. 27, 1934 |
| 2,004,098 | Andrews | June 11, 1935 |
| 2,270,393 | Tate et al. | Jan. 20, 1942 |